HIGH GAIN BROAD BAND ANTENNA

Filed Aug. 12, 1955 3 Sheets-Sheet 1

INVENTOR.
DOUGLAS H. CARPENTER
BY Ostrolenk, Faber, Gerb & Soffen
ATTORNEYS

Jan. 26, 1960 D. H. CARPENTER 2,923,007

HIGH GAIN BROAD BAND ANTENNA

Filed Aug. 12, 1955 3 Sheets-Sheet 2

INVENTOR.
DOUGLAS H. CARPENTER
BY Ostrolenk, Faber, Gerb & Soffen
ATTORNEYS

Jan. 26, 1960 D. H. CARPENTER 2,923,007

HIGH GAIN BROAD BAND ANTENNA

Filed Aug. 12, 1955 3 Sheets-Sheet 3

INVENTOR.
DOUGLAS H. CARPENTER

BY Ostrolenk, Faber, Gerb & Soffen

ATTORNEYS 2,923,007

HIGH GAIN BROAD BAND ANTENNA

Douglas H. Carpenter, Brooklyn, N.Y., assignor to JFD Manufacturing Co., Inc., Brooklyn, N.Y., a corporation of New York Application August 12, 1955, Serial No. 527,929

7 Claims. (Cl. 343—727)

This invention relates to receiving antennae useful for television reception of all channels and is particularly directed to such antenna arrays for high-gain broad-band reception over the whole VHF and UHF ranges.

The VHF television spectrum is divided into two spaced frequency bands, wherein channels 2 to 6 encompass 54 to 88 megacycles and channels 7 to 13 cover 174 to 216 megacycles. There is a gap between the two VHF bands of 85 megacycles. Accordingly, since antennae constructions do not employ electronic circuit elements and must rely on their own physical correlations for performance, combinations of various types have heretofore been employed to broad-band or otherwise receive a band of channels.

The present invention is directed to novel antenna arrangements for receiving all the channels 2 to 13 of the VHF band, with high gain and uniform reception over the respective channels thereof and also have excellent UHF reception from the same antenna array encompassing 470 to 890 megacycles. The antennae of the present invention afford sharp picture clarity and reception and high gain of reception, delivering signals to the television receiver at a maximum signal-to-noise ratio. Accordingly, trouble-free and "snow-free" performance is available for outlying areas with respect to television transmitters. Also, the front-to-back ratio of reception versus interference is high. Furthermore, in view of the uniformity of reception over the respective 6 megacycle band width of each channel by the antennae of the present invention, they are outstandingly suitable for fidelity of color signal reception.

An important element in the antennae arrays of the present invention includes the use of a zig-zag or flat plane arrangement tuned for the upper channels of the VHF band, namely channels 7 to 13. Such zig-zag, lying in a single plane, is combined with a suitable transmission line interconnection to a high gain low channel VHF band antenna structure such as a folded dipole or conical array, as will be set forth hereinafter. The novel combination of the antenna sections of the present invention affords excellent high gain reception throughout the VHF range and also in the UHF range, as will be set forth. The antennae further include reflectors and directors or phasing elements of specific characteristics related to the aforesaid basic sections of the antenna to further improve the signal-to-noise ratio, front-to-back reception ratio, as well as minimizing extraneous noise and signal interference.

It is accordingly an object of the present invention to provide a novel television receiving antenna having relatively high gain and low noise throughout the VHF and UHF bands.

Another object of the present invention is to provide a novel antenna array having substantially uniform reception on any respective television channel to provide high fidelity of color reception.

A further object of the present invention is to provide a novel high gain television antenna wherein long range snow-free performance and trouble-free operation result.

Still a further object of the present invention is to provide a high gain antenna for television reception, utilizing a novel zig-zag receiving section lying in the plane of reception.

Still a further object of the present invention is to provide a novel high gain low-noise broad band television reception antenna employing a zig-zag in conjunction with a low-channel band dipole.

Still a further object of the present invention is to provide a novel television antenna with high signal to noise ratio over the whole VHF and UHF bands, employing a conical low channel element in novel conjunction with a zig-zag for the high VHF channels.

These and further objects of the present invention will become more apparent in the following description of exemplary embodiments thereof, taken in conjunction with the following drawings in which.

Figure 1:
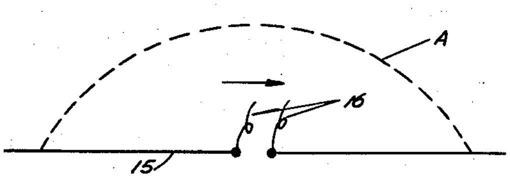
Figures 1, 2 and 3 are diagrammatic representations of theoretical considerations in antenna.

In the early days of television, only pentode tubes were available for use in RF amplifiers. Considerable gain was realized, but the limiting factor of the usable signal was the amount of noise generated in the first amplifying stage. The weak television signal had to override this fixed level before any signal could be amplified. As electronic design progressed, balanced triode tubes were used that reduced the amount of gain available but reduced also by a much greater ratio the amount of internal noise. The balanced triode then became the industry's standard until, in turn, it was superseded by cascode circuitry. Thus, it can be seen that extreme gain was not the objective of design but rather the greatest amount of usable signal through the first RF stage.

The receiving antenna thus may well be regarded in the same light as electronic amplifying equipment, or as the tuner of a television receiver. Thus, it is vital to regard, in weak signal reception conditions, the signal-to-noise ratio of a receiving antenna system. In other words, the amount of the actual signal that can be realized from a receiving antenna is an important criterion for a given television receiver. There are several factors that enter into the ability of an antenna to deliver maximum magnitude with minimum amplified noise to a receiver. In order of their importance, they are as follows:

(1) Horizontal polar pattern.
(2) Front-to-back and side ratio.
(3) Terminating impedance.
(4) Forward gain.
(5) Vertical polar pattern.

The resultant or effective signal-to-noise ratio of a particular antenna is the compounded effect of the five antenna characteristics hereinabove enumerated. In fact, an antenna rating system employing these five characteristics is used in practice, assigning equal effect to each of the five factors. Thus, as for item 1, the horizontal polar pattern of a simple folded dipole averages about 50°; whereas 10° would be considered the beam width of a perfect antenna. Further, item 2, front-to-back and front-to-side ratios, considered together, would have a 10-to-1 voltage ratio or 20 db value for excellent antennas and is a maximum design standard. Next, item 3, as to terminating impedance, it is the design goal to have the resultant impedance of the composite antenna approximate or equal to that of the transmission line to which it is connected. A ratio of 1:1 is a perfect termination, whereas a maximum of 1.5:1 is the outside limit for practical television reception, wherein the standing wave ratio of the signal is still not a problem in the reception pattern. A typical transmission termination used in practice is 300 ohms.

The forward gain, item 4, of an excellent antenna may be rated at 20 db or a voltage increase of 10 times over that of a simple dipole. The vertical polar pattern is difficult to evaluate in a particular antenna array, as each antenna combination has a different gain or ejection value when the vertical polar angles are considered. The ability of antenna to reject man-made interference and, more important, the fixed noise levels from different antenna angles, contributes to the overall signal-to-noise ratio of an array. A figure of 10 db rejection or a voltage ratio of 3.25 to 1 is considered excellent for antenna arrays.

Thus, if each of the five stated antenna characteristics were given equal weight, or a 20% value where it matches the stated optimum figures hereinabove outlined, an effective signal-to-noise value of 100% would result. It is the purpose of the present invention to provide novel antenna arrays that approach the best overall signal-to-noise factor in most respects over a broad band or wide reception of signal frequencies. Some antennae of the prior art, such as single channel yagi type, have excellent signal-to-noise ratios. However, the present invention is concerned basically with an antenna that has a high gain throughout channels 2 to 13 of the VHF band and good reception throughout the UHF channels. The present invention employs some of the good features of a single channel or yagi type antenna in combination with other factors to broad-band it and maintain its gain and signal-to-noise and other excellent characteristics throughout the television channels.

Figure 2:
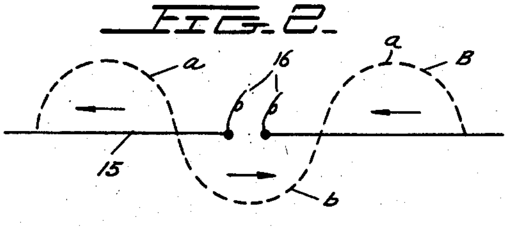

Figure 1 illustrates a simple dipole antenna 15 wherein signals are picked off or otherwise connected to its central portion by transmission leads 16. Figure 1 illustrates the current distribution curve A for the dipole 15 which is at a maximum at the one-half wave length frequency, dependent on the length of the dipole 15. The dipole 15 for the low channels 2 to 6 would provide good reception over the lower channels and a good design center for the dipole would be about channel 3. Nevertheless, when the dipole 15 is subjected to the upper band VHF frequencies, namely those of channels 7 through 13, a current distribution corresponding to curve B results with respect to the dipole as shown in Figure 2. Typically, channel 9 has a center frequency of 189 megacycles which is exactly three times the center frequency of 63 megacycles of channel 3.

Curve B is representative of the three half-wave current curves on a lower channel or low channel dipole 15 for reception of the higher bands impinging thereon. The upper curves *a*, *a* add up in one direction and the central curve *b* in the opposite direction. Accordingly, the gain at the upper bands corresponding to curve B, when added together at transmission lead 16, is only equivalent to one of the upper half-waves *a*, as the lower half wave *b* is in the opposite direction and cancels out one of the upper *a* signals. Thus, a low frequency antenna is of diminishing value at the upper VHF channels spaced approximately three times higher in frequency than the lower VHF band.

Figure 3:
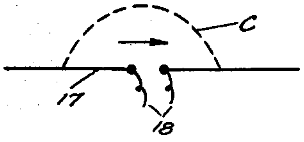

Figure 3 illustrates a dipole antenna 17 proportioned in length to be efficient at the upper VHF channels such as resonant for channel 9. The transmission leads 18 provide a signal from antenna 17 having the general characteristics illustrated by curve C. In order that curve C be made to correspond to the curve *a*, *a* of antenna 15 of Figure 2 and be in the same direction or phase (to the left) as curves *a*, *a*, it is made opposite in phase to the central portion *b*. By suitably reversing the interconnection between antennae 17 and 15, cancellation of the negative signal *b* occurs; and the resultant high frequency signal would thereupon basically correspond to the added magnitudes of curve *a*, *a*.

Figure 4:
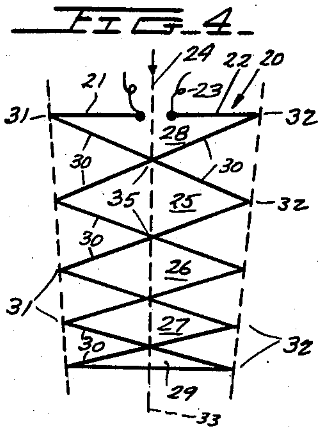
Figure 4 is a diagrammatic representation of the zig-zag antenna of the present invention.

In accordance with the present invention, I provide an effective upper VHF channel antenna element that has a high signal-to-noise ratio over the effective band including channels 7 to 13. Figure 4 illustrates diagrammatically the antenna element 20 which I term a "flat plane zig-zag." The zig-zag 20 employs an effective dipole comprised of elements 21, 22 connected separately and centrally to a transmission line 23. The zig-zag section is in a single plane which in the antenna is a line in the direction of reception, pointing in the direction of the arrow 24. In the prior art, complex space-consuming and expensive actual circular zig-zag arrangements were used. However, the flat or plane zig-zag 20 is simple to construct and mount on an antenna pole and relatively inexpensive, yet as effective as more complex arrays.

The zig-zag 20, as will be more fully described and illustrated in connection with Figures 9 through 12, embodies a tapered array of rhombus elements 25, 26, and 27 extending from the triangular initial dipole element 28 and terminating in a similar triangular element 29. The successive arms of the elements 25 through 29 of zig-zag unit 20 are electrically integral and composed of conductive rods 30, 30 that are either flat or hollow as desired. The rods 30 as will be described are pivotally connected at their respective joining or cross-over portions. The outward corners 31 and 32 of the zig-zag 20 are tapered toward the central axis 33 in the direction away from the dipole elements 21, 22, namely towards the front. While the zig-zag 20 is composed of three rhombus units 25, 26 and 27 and two triangular units 28, 29, it is to be understood that other arrangements and combinations thereof are feasible with equivalent results.

The zig-zag 20 configuration is effective to broad band reception by itself over channels 7 through 13. The cross-over points 35 of the zig-zag element are preferably electrically interconnected and in the preferred embodiments illustrated in Figures 9 through 12 are grounded to the supporting pole of the zig-zag 20 along the axis 33 thereof and to the antenna ground structure. The terminus points of dipole element 21, 22 is, of course, insulated from the antenna structure and connected to the transmission leads 23.

Figure 5:
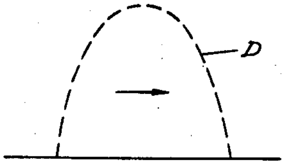
Figure 5 is a curve of current distribution of the zig-zag antenna of Figure 4.

Figure 5 illustrates the current distribution curve D of the flat plane zig-zag 20 proportioned for the upper VHF band encompassing 174 to 216 megacycles (channels 7 through 13). It will be noted that curve D is of a significantly larger amplitude than that of the simple dipole 17 represented by curve C of Figure 3 and its current phase in the same direction as that of curve C. Accordingly, should the zig-zag 20 be substituted for the dipole 17, in the reverse phase interconnection with the low frequency dipole 15, an effective additional gain occurs in the additive section with the currents *a*, *a* of curve B, resulting in a far greater high channel overall signal gain. Towards this end, a composite antenna in accordance with the present invention is diagrammatically illustrated in Figure 7, with the composite current distribution curve therefor illustrated in Figure 6.

Figure 7:
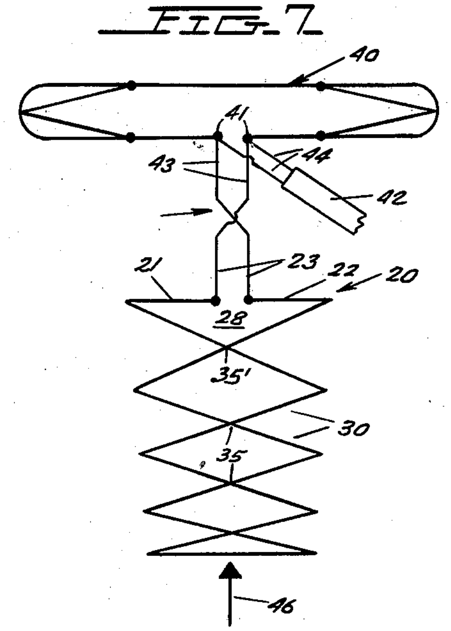
Figure 7 is a diagrammatic representation of one embodiment of the present invention employing a zig-zag in conjunction with a folded dipole.

An exemplary embodiment of an all-channel high-gain broad-band antenna array in accordance with the present invention is illustrated diagrammatically in Figure 7. The zig-zag 20 corresponding to that of Figure 4 is in a single flat plane and is designed to have maximum gain and effect in the upper VHF band encompassing channels 7 through 13. The length of the front dipole section 21, 22 thereof together with the size of the first triangle section 28 to the first cross-over point 35′ has a special significance with respect to the low frequency antenna section, as will be set forth. The low frequency VHF band, encompassing channels 2 to 6, is in the embodiment of Figure 7 received officially by the folded dipole 40 having a flat continuous loop open and insulated at its terminal section 41 which is connected to the balanced transmission line 42 to the television receiver (not shown).

The folded dipole has a current distribution of received signals in the low band channels 2 to 6 corresponding to that of a simple open dipole 15, as shown in Figure 2, curve B. However, the folded configuration of dipole 40 emphasizes the gain and provides a greater signal input to transmission line 42 as is well understood by those skilled in the art. In accordance with the present invention, the flat zig-zag 20 is interconnected with the folded dipole 40 by the transmission element or harness 45 having terminal leads 43, 43 connecting to the terminals 41, 41 centrally of dipole 40 and the lead ends 23, 23 connecting to the terminals of the dipole section 21, 22 of zig-zag 20. It is to be noted that the transmission element 45 is reversed 180° between the leads 43 and 23 thereof. This 180° reversal for the interconnection of antennae 20 and 40 results in the cancellation of the negative or reverse high frequencies *b* shown in Figure 2 when the composite antenna array provides signal reception in the upper channels 7 to 13 to transmission line 42, as well as in the UHF channel band.

A feature of the antenna of Figure 7 is that on channels 2 through 6 the folded dipole or low frequency element 40 operates independently of the zig-zag 20 and provides a high signal in the lower channels to the transmission line 42. The effective reception of the low channels 2 to 6 by the zig-zag 20 is small and accordingly does not materially contribute to that as received and transmitted by the basic low channel element, the folded dipole 40. However, as set forth above, the proportioning of the length of the harness 45 interconnecting the antenna 20 with dipole 40 as well as the physical design of the dipole 21, 22 of zig-zag 20 and the size of the first triangle 28 thereof to the first cross-over point 35′ is such as to provide a stub reflecting a high impedance at the terminals 41, 41 of the folded dipole 40. Thus, the effect of the connected zig-zag 20 to the dipole 40 at channels 2 to 6 is negligible and the operation of the folded dipole for the lower channels is practically independent of the interconnected zig-zag 20 thereto.

Figure 6:
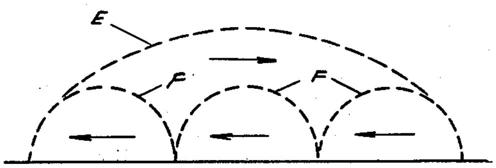
Figure 6 is a set of curves illustrating the current distribution in the novel antenna construction represented in Figure 7.

On the upper band channels 7 to 13, however, the effect of the zig-zag 20 corresponding to the curve D of Figure 5 is superimposed upon the normal curve corresponding to curve B (Figure 2) that the low frequency antenna 40 would have for the upper channels and results in the curve F, F of Figure 6 at the higher frequencies. In other words, the negatively phased high frequency signals corresponding to curve *b* (Figure 2) normally at the center of the folded dipole for the high channels is negative and otherwise rendered ineffective by the greater signal corresponding to curve D (Figure 5) for the upper channels by zig-zag 20; and the additive curves F, F of Figure 6 results in a high signal value or gain for channels 7 to 13 due to the composite reception of the antenna section 20 and 40 to transmission line 42.

Figures 11, 12:
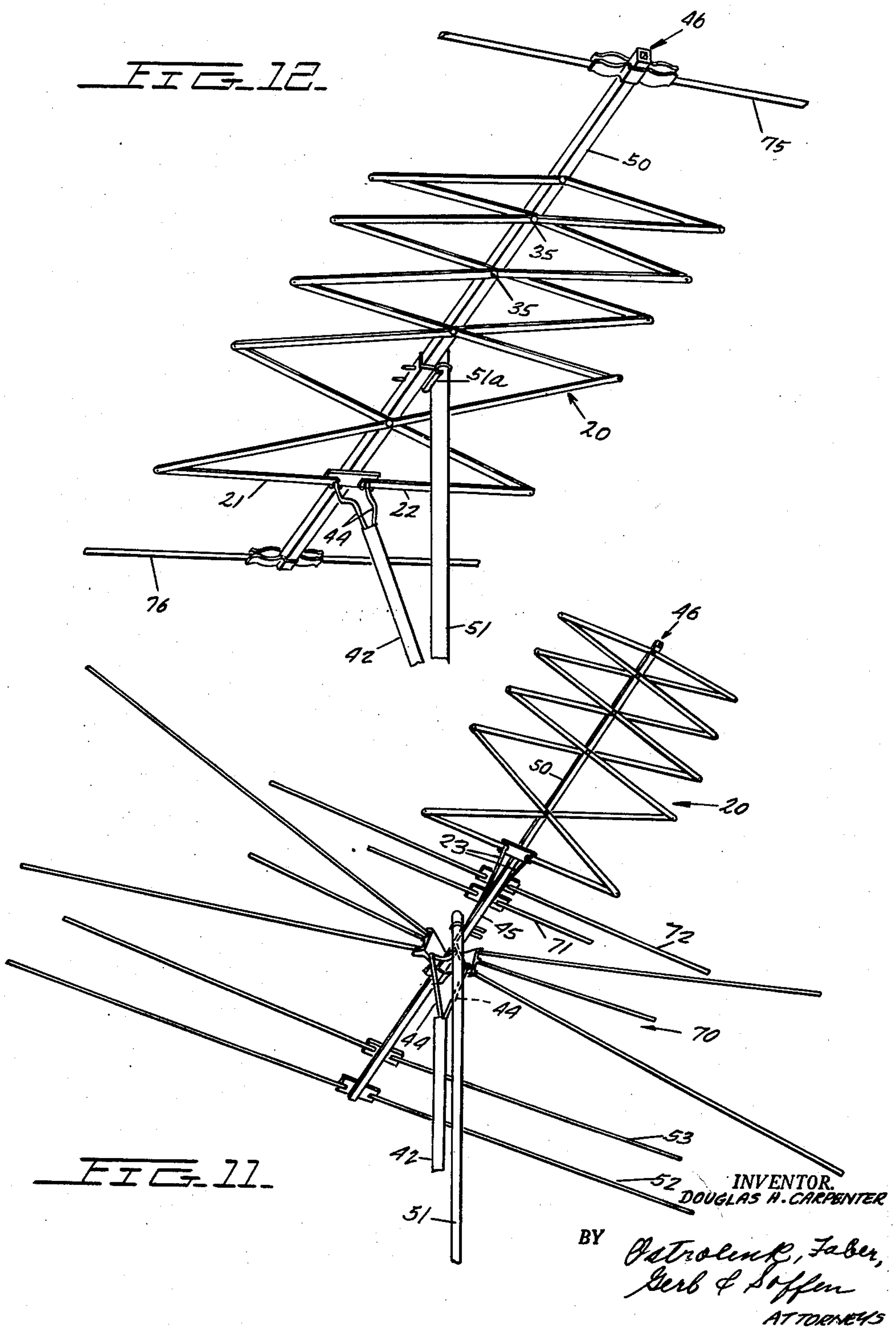
Figures 11 and 12 are further embodiments of antennae in accordance with the present invention.

In summary, the exemplary diagrammatic antenna (Figure 7) employs a basic folded dipole or equivalent element such as a conical dipole array as will be set forth in Figure 12 or other equivalent element for high gain in channels 2 to 6, in combination with the zig-zag array 20 interconnected therewith by transmission line 45 with a 180° reversal. The low frequency antenna 40 operates effectively with high gain over channels 2 to 6 without interference or electrical intereffects from the interconnected zig-zag 20, whereas at the upper channels 7 to 13, the zig-zag 20 combines effectively with the reception of the channels 7 to 13 by the basic low frequency array, namely the folded dipole 40, to provide a high gain for the channels 7 to 13. It has also been found by experimentation and field measurements that the composite antenna array of Figure 7 also provides very effective gain for the UHF channels 14 through 83, namely in the 470 to 890 megacycle range, with a high signal-to-noise ratio and a gain comparable to that of the low channels 2 to 6 thereof.

Figure 8:
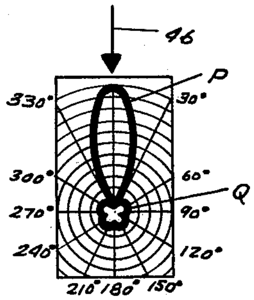
Figure 8 is a polar curve illustrating the reception pattern of antennae in accordance with the present invention such as illustrated in Figures 9 and 10 and as diagrammatically represented in Figure 7.

A further important advantage of the antenna arrays of the present invention is the high front or side-to-back signal ratios to minimize interference and other deleterious effects in reception. Figure 8 is a polar diagram showing the reception pattern of the antenna array of Figure 7, as well as those of the other embodiments of the invention to be described in connection with Figures 9 and 12. The polar lobe P in the direction of reception corresponding to arrow 46 is a maximum in the direction of reception of the signals with respect to antenna 7, as indicated by arrow 46 in both figures. It is noticed that it is very significant in the signal direction with high gain and tapers off sharply in the other angular directions. The rearward pattern Q of Figure 8 shows the attenuated and low sensitivity of the antenna arrays to the rearward direction. Such excellent polar reception characteristic of the antenna array of the invention coupled with the high gain and low signal noise provides interference-free reception due to man-made interference or other channels or frequencies in directions opposite to the signal direction 46.

Figures 9, 10:
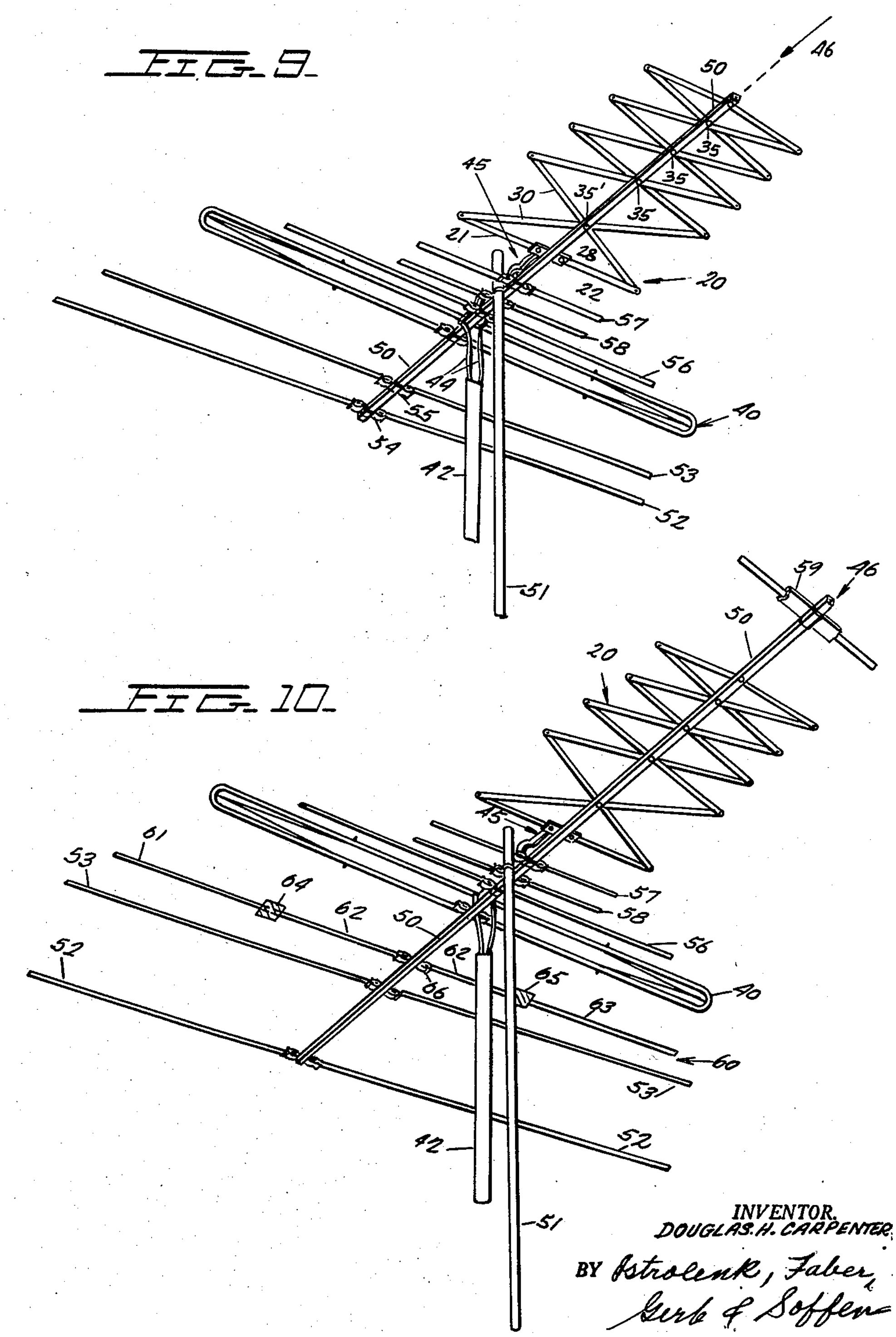
Figures 9 and 10 illustrate in perspective preferred embodiments of antennae in accordance with the present invention.

Figure 9 illustrates a practical exemplary embodiment of an antenna array corresponding to the diagrammatic illustration of Figure 7, embodying the zig-zag 20 and the folded dipole 40 thereof. The zig-zag 20 is structurally mounted on a metallic bar 50 extending from the mount of antenna pole 51, also of conducting material such as aluminum. The cross-bar 50 is suitably joined to the pole 51 and oriented in a horizontal plane and in the axial direction of reception 46. The antennae sections 20 and 40 are interconnected by the harness 45 partially seen in Figure 9. It is to be understood electrically the equivalent to the interconnection at 45 shown in Figure 7 and including the terminal leads 44, 44 of the transmission line 42. The zig-zag antenna 20 is center grounded across its cross-over points 35, 35 connected mechanically to the cross bar 50 which, in turn, is mechanically and electrically connected to the vertical mount 51 of the antenna, in turn grounded.

As is well known, a folded dipole such as 40 has a resonant point determined by its transverse length. It is also well known in the art that the gain of any dipole including such a folded one remains substantially fixed over a much greater frequency range above its resonant point as compared to those frequencies below. Thus, for broad band considerations or for reception of channels 2 to 6 it is preferred that the design point for the effective length of folded dipole 40 be slightly above the frequency for channel 3, namely about 66 to 68 megacycles. In conjunction with such preferred frequency for the dipole 40, a pair of reflectors 52 and 53 is added behind the dipole 40 away from signal direction 46. The reflectors are conductive elements electrically and mechanically secured at 54 and 55, respectively, to the cross beam 50 of the antenna structure.

In the exemplary embodiment, the half-wave or resonant frequency for reflector 52 is at the channel 2 frequency, and that of reflector 53 at the channel 3 frequency. The function of these reflectors is to change the impedance as seen at the folded dipole terminals back to the transmission line value on channel 4, as well as the gap between channels 4 and 5. In other words, with a top of channel 3 frequency for the dipole 40, and a channel 2 reflector at 52, the provision of the channel 3 reflector 53 evens out the effective impedance appearing at the leads 44 of transmission line 42 to the desired value further across channel 4 and in the gap covering frequencies 72 to 76 megacycles up to channel 5. A further resonant transverse element 56 is added to the antenna array of Figure 9 in the direction behind that of the signal direction 46 and namely between the folded dipole 40 and the zig-zag 20. The element 56 may be termed a director. However, since it is in close proximity to the dipole 40 as shown, its function is similar to that of the reflector element 53 and affects the impedance of the dipole 40 on channel 5 and channel 6.

In other words, the effect of the element 56 in conjunction with reflector elements 52 and 53 is to even out the effective impedance (and the effective gain) of the antenna array, namely of the resonant folded dipole 40 as appearing in leads 44 transmission line 42 to render the whole effectively close to the design center, namely 300 ohms in the practical embodiment, throughout channels 2 to 6 reception. Thus, the high effective gain of the folded dipole 40 over channels 2 to 6 is effectively maintained at its transmission to line 42 with a minimum of mismatch or misphasing and with, accordingly, a low VSWR.

As stated hereinabove, the arrangement of the dipole element 21, 22 and configuration of the first triangle 28 and first cross-over point 35′ of zig-zag 20 in conjunction with the length of the harness 45 acts as a closed stub to reflect an impedance into the folded dipole 40. Such impedance is made close to the line value, namely of line 42, at the high end of the lower channels, namely near channel 6. Since negligible low frequency pick-up is made by units 20, the effect of such impedance reflected into the antenna 40 is to raise the gain of channel 6 and provide a high gain antenna substantially uniformly across channels 2 to 6. In practice, an antenna construction corresponding to Figure 9 in accordance with the present invention has provided antenna signal gain uniformly across channels 2 to 6 of the order of 5 to 8 db.

A further important feature of the antenna array of Figure 9 is the provision of means to increase the gain on the high channels 7 to 13 of zig-zag 20 to equalize normal propagation losses. Towards this end, two high channel phasing elements 57 and 58 are electrically and mechanically secured to the transverse bar 50 and parallel with the dipole 40. Elements 57 and 58 are secured between the zig-zag 20 and dipole 40 antenna units. The element 57 acts as a reflector in the higher channels while the element 58 serves to block high channel energy from being received by the center section of the large folded dipole.

The effect is to broad-band the physical structure corresponding to zig-zag 20, providing effectively uniform reception over channels 7 to 13. In a practical embodiment, actual measurements of reception were taken with an antenna corresponding to Figure 9 and provided a signal gain of the order of 14 to 16 db over channels 7 to 13 substantially uniformly. It will be noted that the gain of the higher channels by the antenna of Figure 9 is about 6 or 7 db higher than that provided by the lower channels. It has also been found that measurements of gain in the UHF channels 14 to 83 with an antenna corresponding to Figure 9 provided a uniform gain throughout the UHF band of the order of 3 to 4 db, being slightly lower than that afforded by the antenna array on channels 2 to 6.

Nevertheless, an important feature of the invention is that the gain at any particular channel throughout the television spectrum of channels is flat within an overall swing of less than 2 db over the 6 megacycles of the channels. Thus, the antenna structure in accordance with the invention are eminently useful for the reception of color television signals where for true color reproduction the antenna gain across each individual channel cannot vary more than 2 db. The antennae of the present invention provide uniform reception throughout channels 2 to 83 with a variation within any one channel of less than 1 db.

The zig-zag 20 as used in the exemplary embodiment of Figure 9 is maintained in the horizontal plane and in, generally, the direction of the signals as received 46. The elements of zig-zag 20 are tapered toward the direction of the signals as described and illustrated in connection with Figure 4 and shown in Figure 7. Such tapering of the zig-zag 20 toward the signal direction broadens the band width to provide more uniform reception, that is, reception with a substantially flat response over the channels 7 through 13, as well as for the UHF channels 14 to 83. Furthermore, a higher gain and better signal-to-noise ratio in such signal bands occurs with the described zig-zag. The flat zig-zag 20 is of a relatively small size, weight and cost as compared to the prior devices. All the cross-over points 35, 35 including 35′ are electrically joined and connected mechanically and electrically with the cross bar 50 for grounding. The terminal portions at the dipole sections 21, 22 connected to the transmission line 45 are, of course, insulated from the cross-over bar 50 and the antenna structure itself.

Figure 10 is a modified version of the antenna array of Figure 9 and embodies the flat plane zig-zag 20 and folded dipole 21 duly interconnected by the transposed transmission section 45 and connected to transmission line 42, together with the reflectors 52, 53 and phasing elements 56, 57, 58 between antennae sections 20 and 40. The antenna array of Figure 10 embodies further a director 59 ahead of the zig-zag section 20 and secured to the transverse bar 50 electrically and mechanically, together with a split reflector 60 transversely supported across the bar 50 and behind the folded dipole 40. The split reflector 60 is comprised of three sections 61, 62, 63 insulated from each other by members 64, 65. The central section 62 of split reflector 60 is secured to the cross bar 50 by brackets 66 and electrically grounded therewith. The combination of the split reflector 60 and the director 59 adds high frequency gain to the antenna array, namely improves the signal further in channels 7 to 13 over that of Figure 9. In all other respects, the advantages and operation of the antenna of Figure 10 are identical with that of Figure 9, as previously described.

Figure 11 is a modified form of the antenna in accordance with the present invention and corresponds essentially to the antenna illustrated in Figure 9 with the substitution of an open end conical low band antenna 70 for the folded dipole 40. The conical dipole antenna 70 is arranged in a plane perpendicular to that of the cross bar 50 or, in other words, a plane that is vertical or parallel to the antenna mast 51. The transmission line interconnecting the flat zig-zag plane 40 with the conical dipole 70 is the transposed transmission line 45. The rear reflector elements 52 and 53 perform the same function as described for the antenna of Figure 9, and the phasing director elements 71 and 72 correspond to the elements 56 to 58 of Figure 9 for rendering the impedance termination of the antenna array to transmission line 42 close to the desired value, namely 300 ohms, over the whole television band of channels. The effective operation of the array of Figure 11 is comparable to that of Figure 9 in all other respects, with the exception that the folded dipole arrangement 40 of Figure 9 provides a better side-to-front rejection of signal than the open-ended conical dipole 70. The conical dipole, however, provides excellent UHF reception for the antenna array without any forward angular tilt thereof required.

Figure 12 is still a further and simplified version of an antenna employing the flat conical zig-zag 20 of the invention. As previously set forth in connection with the description of Figures 4, 7 and 9, the flat tapered unit 20 is structurally designed to receive channels 7 to 13 as well as the UHF channels. The flat zig-zag 20 is secured to the metal cross bar 50 of the antenna mast structure, which in turn is secured to the vertical mast 51 by fastening means 51*a*. The center of the zig-zag structure 20 is grounded along the cross-over point 35 to the mast structure. The zig-zag is connected directly to the transmission line 42 through the lead 44 thereof at the insulated dipole 21, 22 section thereof. In other words, the zig-zag 20 is employed directly as an antenna receiver element and is effective in the embodiment of Figure 12 substantially only for the higher frequencies encompassed by the VHF band, namely channels 7 to 13, as well as the UHF band.

The flat zig-zag reception is improved by the use of the director element 75 at the forward portion thereof toward the direction of signal reception 46 and the reflector element 76 at the rear section thereof, both supported by and grounded to the transverse bar 50. Since the structure of Figure 12 is not for the reception of low VHF band channels 2 to 6, the elimination of the low frequency dipoles corresponding to the folded dipole 20 (Figure 9) or the conical dipole 70 (Figure 11) does not disturb the other positive functions and advantages of the zig-zag unit 20 as an antenna per se. The gain, signal-to-noise ratio, polar reception distribution, namely as from front-to-back and side-to-back rejection, is excellent with a uniform reception pattern over the higher channels suitable for color television reception.

While I have disclosed several embodiments, features and factors in conjunction with the invention herein, it is to be understood that modifications are feasible without departing from the broadest spirit and scope of the invention as defined in the following claims.

I claim:

1. A high gain broad band receiving antenna for television signals encompassing the lower VHF band of channels 2 to 6 and the upper VHF band of channels 7 to 13 comprising a dipole section cut to receive channel 2 to 6 signals; a flat plane zig-zag section cut to receive channel 7 to 13 signals and the UHF band; said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded; said sections lying substantially in the plane of polarization of the signals to be received; and transmission means interconnecting said dipole sections and said zig-zag section in 180° out-of-phase relation whereby the composite reception by said sections is enhanced for the upper VHF band and for the UHF band, and reception by the dipole section of the lower VHF band is substantially unimpeded by the connection thereto of said zig-zag section.

2. A high gain broad band receiving antenna for television signals encompassing the lower VHF band of channels 2 to 6 and the upper VHF band of channels 7 to 13 comprising a conical dipole section cut to receive channel 2 to 6 signals; a flat plane zig-zag section cut to receive channel 7 to 13 signals; said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded; said sections lying substantially in the plane of polarization of the signals to be received; and transmission means interconnecting said dipole section and said zig-zag section in 180° out-of-phase relation whereby the composite reception by said sections is enhanced for the upper VHF band; and reception by the dipole section of the lower VHF band is substantially unimpeded by the connection thereto of said zig-zag section.

3. A high gain broad band receiving antenna for television signals encompassing the lower VHF band of channels 2 to 6 and the upper VHF band of channels 7 to 13 comprising a folded dipole section cut to receive channel 2 to 6 signals; a flat plane zig-zag section cut to receive channel 7 to 13 signals; said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded; said sections lying substantially in the plane of polarization of the signals to be received; transmission means interconnecting said dipole sections and said zig-zag section in 180° out of phase relation whereby the composite reception by said sections is enhanced for the upper VHF band and for the UHF band, said transmission means and said zig-zag section reflecting a high impedance at the terminals of said dipole section for the lower VHF band signals, whereby reception by the dipole section of the lower VHF band is substantially unimpeded by the connection thereto of said zig-zag section; and a plurality of conductive grounded cross arms located near to and parallel with said dipole section, said arms being cut and located to even out the terminal impedance and gain of said antenna across channels 2 to 6.

4. A high gain broad band receiving antenna for television signals encompassing the lower VHF band of channels 2 to 6 and the upper VHF band of channels 7 to 13 and the UHF band comprising a dipole section resonant near channel 3 to receive channel 2 to 6 signals; a flat plane zig-zag section cut to receive channel 7 to 13 signals; said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded; said sections lying substantially in the plane of polarization of the signals to be received; transmission means interconnecting said dipole section and said zig-zag section in 180° out of phase relation whereby the composite reception by said section is enhanced for the upper VHF band and for the UHF band, said transmission means and said zig-zag section reflecting a high impedance at the terminals of said dipole section for the lower VHF band signals, whereby reception by the dipole section of the lower VHF band is substantially unimpeded by the connection thereto of said zig-zag section; and a plurality of conductive grounded cross-arms located near to and parallel with said dipole section, said arms being cut and located to even out the terminal impedance and gain of said antenna across channels 2 to 6 and comprising a first reflector tuned to channel 2, a second reflector tuned to channel 3 and a third reflector type unit located between said sections and tuned to channel 5; the overall gain and terminal impedance of the antenna being substantially uniform across any one received television channel to provide fidelity of color signal reception.

5. A high gain broad band receiving antenna for television signals encompassing the lower VHF band of channels 2 to 6 and the upper VHF band of channels 7 to 13 and the UHF band comprising a dipole section resonant near channel 3 to receive channel 2 to 6 signals; a flat plane zig-zag section cut to receive channel 7 to 13 signals; said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded; said sections lying substantially in the plane of polarization of the signals to be received; transmission means interconnecting said dipole section and said zig-zag section in 180° out of phase relation whereby the composite reception by said section is enhanced for the upper VHF band and for the UHF band, said transmission means and said zig-zag section reflecting a high impedance at the terminals of said dipole section for the lower VHF band signals, whereby reception by the dipole section of the lower VHF band is substantially unimpeded by the connection thereto of said zig-zag section; a plurality of conductive grounded cross-arms located near to and parallel with said dipole section, said arms being cut and located to even out the terminal impedance and gain of said antenna across channels 2 to 6 and comprising a first reflector tuned to channel 2, a second reflector tuned to channel 3 and a third reflector type unit located between said sections and tuned to channel 5; and a pair of grounded conductive cross arms adjacent the dipole unit of said zig-zag section, said pair of cross arms being cut and located to serve as phasing elements to enhance the gain of reception of said zig-zag section in the upper VHF and UHF bands; the overall gain and terminal impedance of the antenna being substantially uniform across any one received television channel to provide fidelity of color signal reception.

6. A high gain broad band receiving antenna for television signals encompassing the lower VHF band of channels 2 to 6 and the upper VHF band of channels 7 to 13 and the UHF band comprising a dipole section resonant near channel 3 to receive channel 2 to 6 signals; a flat plane zig-zag section cut to receive channel 7 to 13 signals; said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded; said sections lying substantially in the plane of polarization of the signals to be received; transmission means interconnecting said dipole section and said zig-zag section in 180° out of phase relation whereby the composite reception by said section is enhanced for the upper VHF band and for the UHF band, said transmission means and said zig-zag section reflecting a high impedance at the terminals of said dipole section for the lower VHF band signals, whereby reception by the dipole section of the lower VHF band is substantially unimpeded by the connection thereto of said zig-zag section; a plurality of conductive grounded cross-arms located near to and parallel with said dipole section, said arms being cut and located to even out the terminal impedance and gain of said antenna across channels 2 to 6 and comprising a first reflector tuned to channel 2, a second reflector tuned to channel 3 and a third reflector type unit located between said sections and tuned to channel 5; and a pair of grounded conductive cross arms adjacent the dipole unit of said zig-zag section, said pair of cross arms being cut and located to act as phasing elements to enhance the gain of reception of said zig-zag section to signals in the upper VHF and UHF bands, and a linear cross element behind said zig-zag section and having two insulated split portions to constitute three conductive aligned rods resonant in the upper VHF band thereby enhancing the gain of reception of said zig-zag section in the upper VHF and UHF bands; the overall gain and terminal impedance of the antenna being substantially uniform across any one received television channel to provide fidelity of color signal reception.

7. A high gain receiving antenna for television signals encompassing the upper VHF band of channels 7 to 13 comprising a flat plane zig-zag section cut to receive channel 7 to 13 signals, said zig-zag section having a dipole unit with conductive arms extending from the unit ends criss-crossed into a plurality of rhombus areas extending from the dipole unit in a single plane with the width of each succeeding rhombus less to constitute a tapered zig-zag array, the cross-over points of said arms being interconnected electrically and grounded, said section lying substantially in the plane of polarization of the signals to be received.

References Cited in the file of this patent

UNITED STATES PATENTS

| | | |
|---|---|---|
| 2,619,596 | Kolster | Nov. 25, 1952 |
| 2,638,545 | De Peau et al. | May 12, 1953 |
| 2,700,105 | Winegard | Jan. 18, 1955 |
| 2,701,308 | Kay | Feb. 1, 1955 |

OTHER REFERENCES

Trio-Radio Electronics, Vol. 23, Issue 13, page 88, Oct. 1952.